(No Model.)
J. C. GRANT.
TIRE COVER FOR VEHICLE WHEELS.
No. 589,426. Patented Sept. 7, 1897.
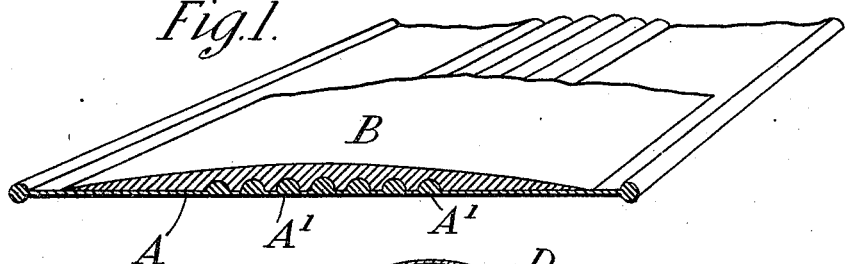
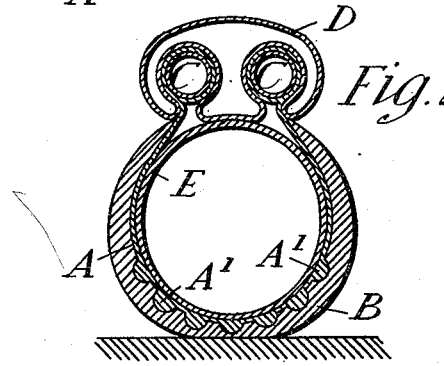
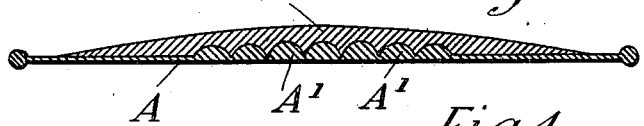
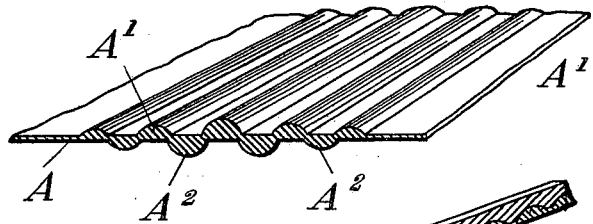
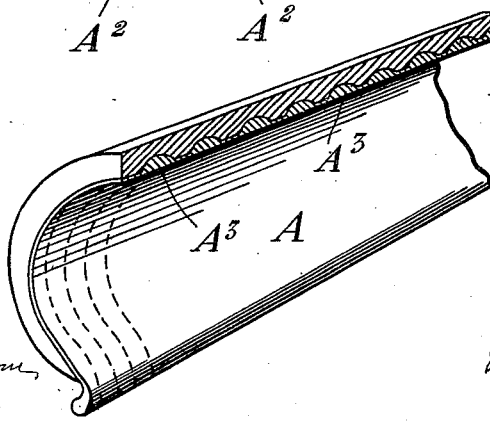
Witnesses
Inventor
John Cameron Grant
by Bakewell & Bakewell
his attys.

UNITED STATES PATENT OFFICE.

JOHN CAMERON GRANT, OF LONDON, ENGLAND.

TIRE-COVER FOR VEHICLE-WHEELS.

SPECIFICATION forming part of Letters Patent No. 589,426, dated September 7, 1897.

Application filed January 26, 1897. Serial No. 620,781. (No model.)

*To all whom it may concern:*

Be it known that I, JOHN CAMERON GRANT, a citizen of England, residing at Albert Lodge, Albert Place, Kensington, London, in the county of Middlesex, England, have invented a certain new and useful Improvement in Pneumatic Tires and Tire-Covers for Cycle and other Road Wheels, of which the following is a specification.

All pneumatic tires and covers for tires heretofore proposed suffer from two disadvantages—namely: first, their liability to become punctured, and, secondly, their liability to slip sidewise, by which most of the serious cycling accidents are caused. The forming of ribs or recesses on the outer surface of the caoutchouc coating of the cover or tire does not avoid this danger, because either the ribs become squeezed quite flat on the ground by the load on the wheels or the recesses or grooves become filled with caked mud, which may render the tire more liable to slip than if its surface were smooth.

According to my present invention I practically avoid both the above-named disadvantages by employing as the woven fabric that constitutes the foundation or backing of the caoutchouc tire or cover a fabric made preferably of rhea fiber, (*Urtica textilis* or *Bœhmeria nivea*,) which is so woven as to present a series of projecting hard ribs either on the outer surface alone or both on the outer and the inner surface of the fabric, such ribs being made either in the longitudinal or the transverse direction, but preferably the former. By the employment of such ribbed fabric of rhea fiber in combination with the caoutchouc coating I obtain on the one hand a tire or tire-cover that is practically puncture-proof, in particular when internal as well as external ribs are employed in the manner to be presently explained, while on the other hand the action of the hard ribs of the foundation is such that on pressing the tire with increasing force onto the ground the caoutchouc covering is pressed more and more in a lateral direction from under the hard ribs, so that the hold of these, and consequently the tire, upon the ground is correspondingly increased and side slip is practically avoided.

Figure 1 of the accompanying drawings shows a perspective section of a part of a tire-cover constructed with a foundation or backing A of woven rhea fiber having hard longitudinal ribs A' formed thereon in the weaving. These ribs may be of any size and number and may extend only over the middle part of the cover, as shown, or over a greater part of the width. When the cover thus formed is fitted on a pneumatic wheel-tire and subjected to pressure on the ground, as shown in the section at Fig. 2, the outer layer of caoutchouc B, which is preferably left quite smooth, will be squeezed away from under the ribs A', which will consequently bear almost directly upon the ground and thus afford a firm grip on the latter, so as to practically avoid side slip, even when running at a considerable angle. The said ribbed rhea fabric in addition to fulfilling the above function will also have the property of effectually resisting puncture, as not only does the thickness of the ribs prevent this, but also the rhea-fiber fabric is of itself of so strong a nature as practically to resist puncture also in the parts between the ribs, and this may be still further insured either by weaving the ribs so as to lie close together, as shown at Fig. 3, or preferably by weaving ribs $A^2$ on the under side of the fabric at the spaces between the ribs A' on the upper side, as at Fig. 4. Fig. 5 shows the ribs $A^3$ formed so as to run transversely across the cover instead of longitudinally.

The cover A may be secured on the wheel-rim in any known manner, such as by wires, or, as as shown at Fig. 2, by means of auxiliary pneumatic tubes C, fitted in corresponding channels formed in the wheel-rim D, as described in the specification to my application bearing equal date herewith. With this construction the ribbed cover A may either be employed in combination with an ordinary inner pneumatic tire E, as shown at Fig. 2, or it may be itself formed into a closed pneumatic tire, as described in the above-mentioned specification.

Although, as above stated, I prefer to employ rhea fiber in the manufacture of the ribbed fabric forming the foundation for the tires and tire-covers on account of its great strength, hardness, and great durability, yet I do not limit myself to the use of this fiber, as the ribbed fabric may also be made of hemp, jute, or other strong fiber.

Having thus described the nature of this invention and the best means I know of carrying the same into effect, I claim—

1. A pneumatic tire or tire-cover consisting of a woven fabric having longitudinal ribs therein and an outer coating filling the spaces between the ribs and covering the same; substantially as described.

2. A pneumatic tire or tire-cover consisting of a woven fabric having hard ribs formed thereon by weaving and coated with caoutchouc, substantially as described.

3. A pneumatic tire or tire-cover, consisting of a woven fabric having longitudinal outer ribs woven therein, and a coating of caoutchouc or similar material covering the ribs and having a substantially smooth outer face; substantially as described.

4. A pneumatic tire or tire-cover consisting of a woven fabric, having outer longitudinal ribs and inner longitudinal ribs alternating therewith, and a coating of suitable material covering the outer ribs; substantially as described.

In testimony whereof I have signed my name to this specification, in the presence of two subscribing witnesses, this 12th day of January, A. D. 1897.

JOHN CAMERON GRANT.

Witnesses:
OLIVER IMRAY,
JNO. P. M. MILLARD.